June 9, 1936.  J. B. STRAUSS  2,043,357
TRUCK FOR AIR TRAMWAYS
Filed Aug. 12, 1931   3 Sheets-Sheet 2
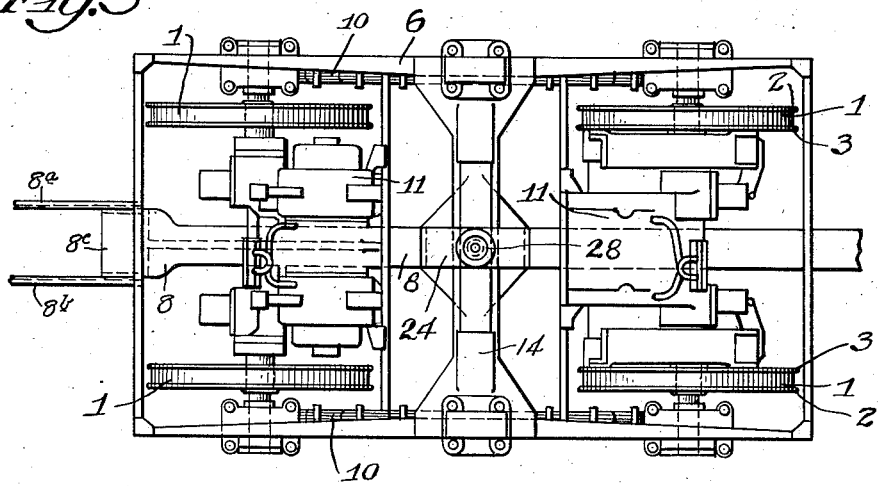
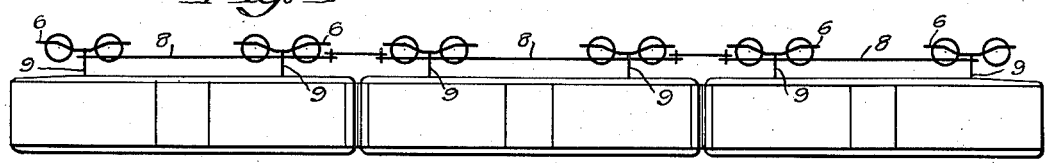
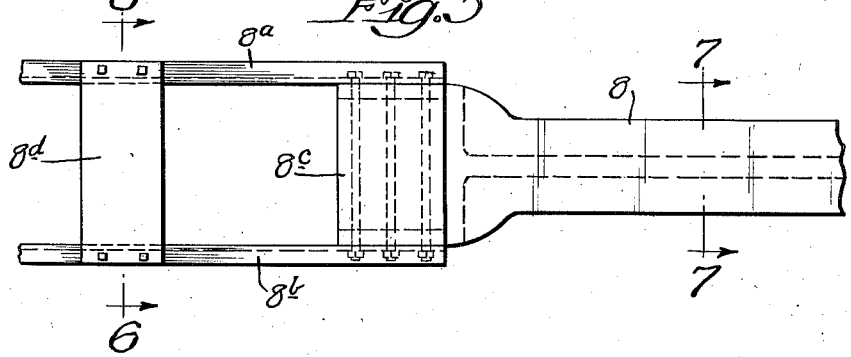
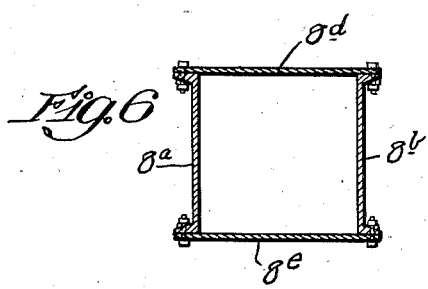
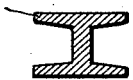
Inventor:
Joseph B. Strauss

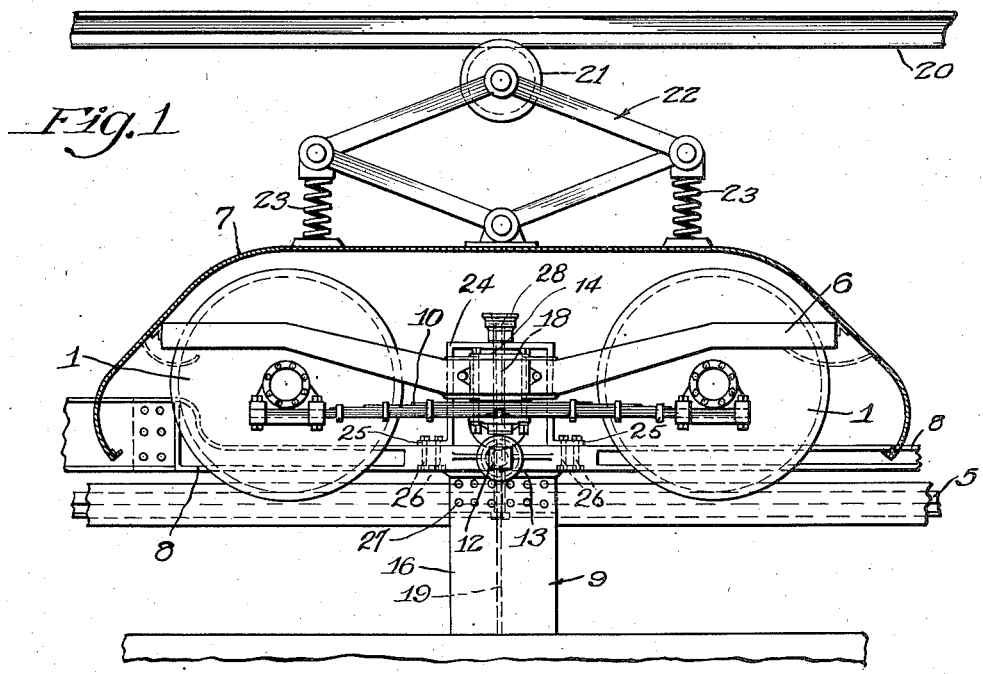
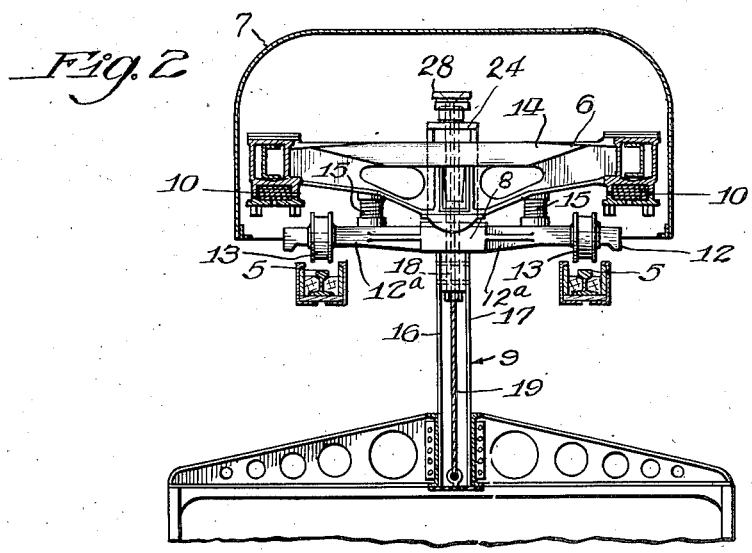

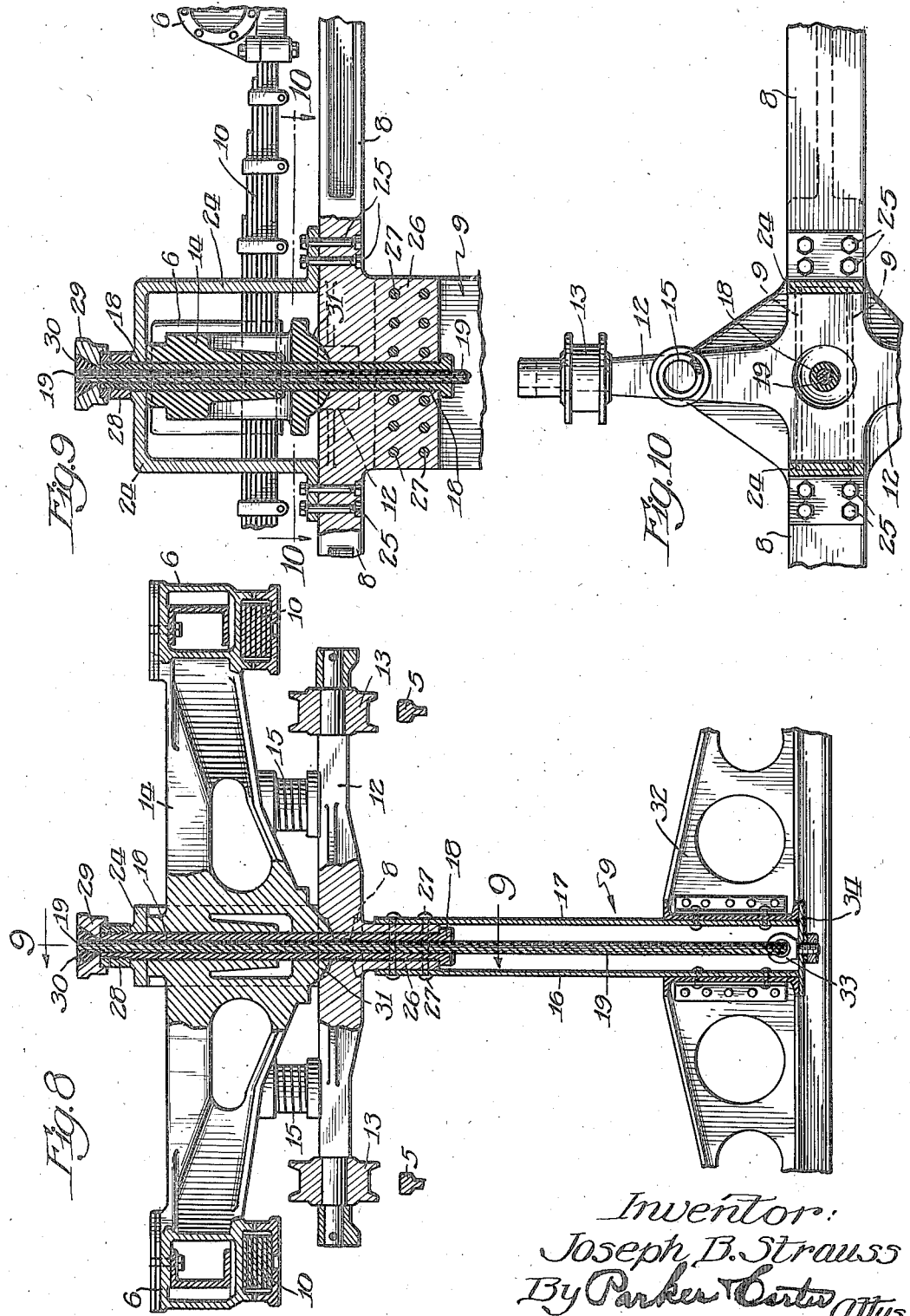

Patented June 9, 1936

2,043,357

UNITED STATES PATENT OFFICE 2,043,357

TRUCK FOR AIR TRAMWAYS

Joseph B. Strauss, Chicago, Ill.

Application August 12, 1931, Serial No. 556,484

9 Claims. (Cl. 104—94)

This invention relates to trucks for air tramways and has for its object to provide a new and improved device of this description. The invention has as a further object to provide a truck which is efficient and safe in operation. The invention has as a further object to provide trucks for air tram-ways wherein the mechanism is all mounted on the trucks, there being nothing on the cars except the controllers, brake valves and connections, thus avoiding noise in the cars. The invention has as a further object to provide trucks arranged so that two trucks are connected by a central needle beam and the cars are suspended from this needle beam. The invention has other objects which are more particularly pointed out in the accompanying description.

Referring now to the drawings, Fig. 1 is a side elevation of one form of truck embodying the invention;

Fig. 2 is a cross section of the truck showing the hanger;

Fig. 3 is a plan view of the truck;

Fig. 4 is a view showing the arrangement of the truck wheels.

Fig. 5 is a plan view of one form of needle beam;

Fig. 6 is a sectional view taken on the line 6—6 of Fig. 5;

Fig. 7 is a sectional view taken on the line 7—7 of Fig. 5.

Fig. 8 is an enlarged view similar to Fig. 2 with parts broken away to show the connection between the parts. Fig. 9 is a sectional view taken on line 9—9 of Fig. 8. Fig. 10 is a sectional view taken on line 10—10 of Fig. 9.

Like numerals refer to like parts throughout the several figures.

Referring now to the drawings, wherein I have shown one form of truck embodying the invention, such trucks are provided with wheels 1. These wheels have double flanges, one on each side. These flanges 2 and 3 are illustrated in Figs. 2 and 3 and are arranged one on each side of the rail 5. This prevents derailment of the trucks. The truck wheels are mounted in bearings on springs carried by the truck frame 6 and the trucks are contained within a stream line hood 7. Each car is provided with two trucks and these trucks are connected together by a central needle beam 8, and the cars are suspended front and rear from this needle beam by the connectors 9. The needle beams may be made of any desired construction. I prefer to arrange them as shown in Fig. 5.

In this construction the needle beam has two parts of different cross section. One part consists of the separated side members 8a and 8b with a space between them. The other part consists of a single beam which may be an I beam, the end 8c being inserted between the separated side members 8a and 8b. The air tanks and other apparatus may be carried between the separated members 8a and 8b, these members being provided at proper intervals with the top plates 8d and the bottom plates 8e. The trucks are provided with automobile spring suspension by means of the springs 10, and with roller bearings and silent drive. The trucks carry all the mechanism for operating the car except the controllers, brake valves and connections, hence there is no noise in the car. The stream line hood subdues the slight wheel noise and motor noises, reduces the air resistance at high speeds, which gives greater efficiency.

The motors 11 are suitably mounted on the trucks, as shown in Fig. 3. These motors are electric motors and receive their current by means of a shoe on the truck which engages an insulated trolley rail above the main tracks.

Connected with each truck is a safety yoke 12 which extends across between the rails and which is provided with the small emergency wheels 13, normally supported just above the track. These wheels are normally out of use and come into use in the event of the failure of the truck, so as to support the car and prevent it from falling. Located between the safety yoke and the bolster 14 of the truck are the springs 15 for the purpose of taking up and limiting the side sway. These twin springs constitute equalizers and partly control the sway of the cars when running. There is a triple connection between the truck and the car. This triple connection consists of the two plates 16 and 17, a hollow king bolt 18 and the safety cable 19. Located above the truck is a top rail 20 which is engaged by a wheel 21 having flanges on opposite sides of the rail. This wheel is mounted on a pantograph support 22 connected with the truck which has vertical adjustment but is rigid laterally. Springs 23 normally hold the wheel in contact with the rail 20. This rail acts as a guide rail to prevent derailment and also acts as a feeder rail for supplying the current to the motors and the cars. As shown in Figs. 1, 8, 9 and 10 the needle beam 8 is connected to the bolster 14 of the truck by means of a connecting member 24 which is attached to the needle beam by the bolts 25 and which passes over the bolster 14. The king pin 18 passes through the member 24. The yoke 12 is connected with or a part of the needle beam 8 and is provided with a projection 26 through which the king pin 18 passes. The member 9 is connected to this projection 26 by the connecting device 27. The cable 19 passes up through the king pin and the bolster 14. A nut 28 on the end of the king pin holds the parts together. A recessed cap 29 fits over this nut and is provided with an enlarged opening for the cable 19 and this cable is fastened to it by an anchoring seal 30. The bolster 14 is provided with a rounded hemispherical member 31 which fits into a recess in the needle beam and yoke at the points where they connect, thereby giving a rocking connection. The truck 6 is fastened to the ends of the bolster, as shown in Fig. 8. The member 9 is connected to the top member 32 of the car, as shown in Fig. 8, and the cable 19 is also connected thereto as shown in this figure by means of an I bolt 33 which passes through a plate 34.

I claim:

1. A truck device for air tram-ways comprising two separated truck frames, wheels connected with said truck frames, a needle beam connecting the two truck frames, cars connected with said needle beam at the front and the rear.

2. A truck device for air tram-ways comprising two separated truck frames, wheels connected with said truck frames, a needle beam connecting the two truck frames, cars connected with said needle beam at the front and the rear, a separate stream line hood for each of said trucks.

3. A truck device for air tram-ways comprising a frame, wheels carried by said frame, a needle beam connected centrally with said truck and projecting beyond the truck, a car, a connection between said car and said needle beam located centrally of said truck.

4. A truck device for air tramways comprising a frame, wheels carried by said frame, adapted to engage the separated rails of the track, a connecting member on the truck extending downwardly therefrom for connecting with the car, a safety yoke connected with said connecting member, said safety yoke provided with wheels which are above the bottom of the wheels of the truck so as to be normally out of engagement with the rails, but which engage the rails and support the car when the truck fails to support it.

5. A truck device for air tramways comprising a frame, wheels carried by said frame, adapted to engage the separated rails of the track, a connecting member on the truck for connecting with the car, a safety yoke connected with said frame, said safety yoke provided with wheels which are above the bottom of the wheels of the truck so as to be normally out of engagement with the rails, but which engage the rails and support the car when the truck fails to support it, a bolster forming a part of the frame of the truck, and springs interposed between the safety yoke and the bolster which act to limit and control the sway when the truck is in motion.

6. A truck device for air tramways comprising a frame having two sets of separated wheels, adapted to engage the rails along which the truck passes, and a safety yoke connected with said truck near its middle and intermediate the two sets of wheels and extending across the rails, but normally out of contact therewith.

7. A truck device for air tramways comprising a frame having separated wheels, adapted to engage the rails along which the truck passes, and a safety yoke connected with said truck and extending across the rails, but normally out of contact therewith, equalizing springs between said yoke and said truck for limiting the sway of the parts when the truck is in motion.

8. A truck device for air tramways comprising a frame, wheels carried by said frame for engaging the rails, a connecting device for connecting the truck to the car, comprising separated side plates connected with the truck and the car, and a safety cable between said side plates connected with the truck and the car.

9. A truck device for air tramways comprising a frame, wheels carried by said frame for engaging the rails, a connecting device for connecting the truck to the car, comprising separated side plates connected with the truck and the car, and a safety cable between said side plates connected with the truck and the car, and a hollow king bolt.

JOSEPH B. STRAUSS.